No. 853,712. PATENTED MAY 14, 1907.
T. MILLIGAN.
AXLE NUT.
APPLICATION FILED NOV. 1, 1906.
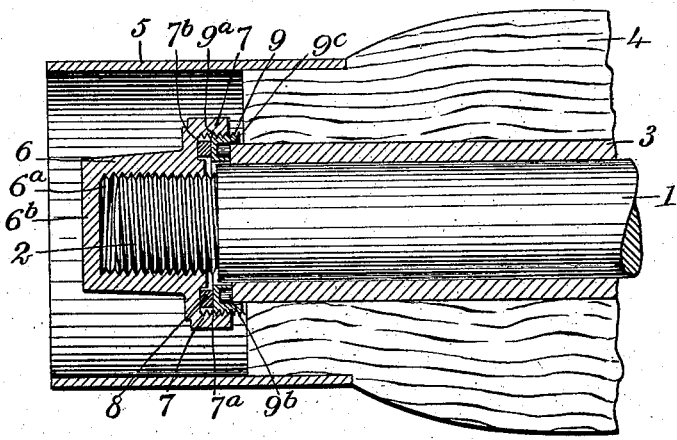
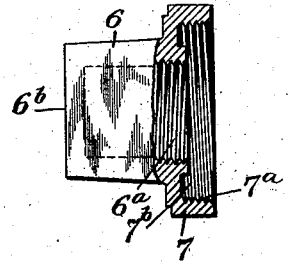 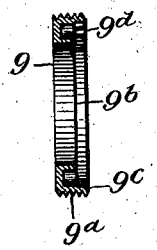 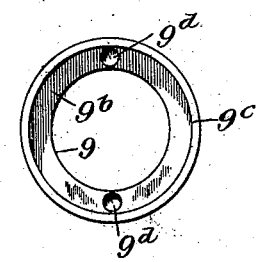
WITNESSES
F. D. Sweet.
INVENTOR
Thomas Milligan
BY Munn & Co.
ATTORNEYS

UNITED STATES PATENT OFFICE.

THOMAS MILLIGAN, OF FORTUNA, CALIFORNIA, ASSIGNOR OF ONE-HALF TO EDGAR McLOUGHLIN, OF FORTUNA, CALIFORNIA.

AXLE-NUT.

No. 853,712.   Specification of Letters Patent.   Patented May 14, 1907.

Application filed November 1, 1906. Serial No. 341,564.

*To all whom it may concern:*

Be it known that I, THOMAS MILLIGAN, a citizen of the United States, and a resident of Fortuna, in the county of Humboldt and State of California, have invented a new and Improved Axle-Nut, of which the following is a full, clear, and exact description.

My invention relates to axle nuts, and has for its object to provide compensating means adapted to take up the lost motion occasioned by the wearing of the end of an axle box, and thereby hold the box against longitudinal motion on the axle.

This I accomplish by the means illustrated in the accompanying drawings, in which drawings like characters of reference indicate like parts throughout the views, and in which Figure 1 is a central longitudinal section of a device embodying my invention attached to the end of an axle spindle; Fig. 2 is a side elevation partly in section, of a cap nut forming part of my invention; Fig. 3 is a transverse section of an extension ring adapted to engage the cap nut; and Fig. 4 is a side elevation of the extension ring shown in Fig. 3.

As illustrated in the drawings, 1 represents the spindle of an axle having a reduced threaded end 2 of ordinary construction, and journaled in an axle box 3 secured to a hub 4 which is provided on its outer end with a flange 5. A nut 6 is provided with an interior bore $6^a$ and preferably with a closed end $6^b$ forming a cap on the nut. An annular collar 7 is formed on the inner end of the nut and is off-set therefrom, and provided with a thread $7^a$ on its interior periphery. An annular recess $7^b$ is preferably formed on the inner face of the nut outside of the threaded bore thereof, and adapted to accommodate a washer 8. An extension collar 9 is provided on its outer periphery with an exterior thread $9^a$, which engages the interior thread $7^a$ of the collar 7 of the nut, and together with said interior thread of the collar is of an opposite character to the thread of the bore of the nut, the thread of the extension collar 9 and the interior thread of the collar 7 of the nut being left-handed, while the thread of the bore of the nut is right-handed. The extension collar 9 is provided with an annular recess $9^b$ in the face of the collar, which permits said face to bear against the end of the axle box 3 and allows a projecting rim $9^c$ to overlap the end of the axle box. The collar 9 is provided with oppositely disposed apertures $9^d$ adapted to receive the pins of a spanner and enable said ring to be adjusted on the collar of the nut. As the axle box 3 is reduced by wear at its end, the extension ring 9 may be readily projected slightly on the collar of the nut, thereby compensating for the wear of the end of the axle box, and preventing longitudinal movement of the hub on the spindle and enabling the hub to rotate evenly and noiselessly thereon.

Having thus described my invention, what I claim as new and desire to secure by Letters Patent is:

The combination with a spindle having a reduced screw threaded end, of a sleeve encircling the spindle, a nut having an exteriorly threaded bore for engaging the reduced end of the spindle, said nut having an annular collar offset from the bore and provided with screw threads, the screw threads of the collar running in the opposite direction from the screw threads on the reduced ends of the spindle, an extension collar or ring having one of its faces adapted to abut against the sleeve, and provided with spaced openings for receiving a spanner, said ring having a flange for overlapping the outer surface of the sleeve near the end thereof, said ring being screw threaded upon its outer face whereby to engage the threads of the annular collar.

In testimony whereof I have signed my name to this specification in the presence of two subscribing witnesses, on this 24th day of October 1906.

THOMAS MILLIGAN.

Witnesses:
JAMES JOHN SCHREIBER,
JOHN WILLIAM DIXON.